Patented Nov. 24, 1925.

1,562,854

UNITED STATES PATENT OFFICE.

CLIFFORD C. SHAFER, OF NEWARK, NEW JERSEY, ASSIGNOR TO GUARANTY EGG CORPORATION, OF NEWARK, NEW JERSEY, A CORPORATION OF NEW JERSEY.

COMPOSITION FOR PRESERVING EGGS.

No Drawing. Application filed May 3, 1923. Serial No. 636,391.

*To all whom it may concern:*

Be it known that I, CLIFFORD C. SHAFER, a citizen of the United States, and a resident of Newark, in the county of Essex and State of New Jersey, have invented a new and Improved Composition for Preserving Eggs, of which the following is a full, clear, and exact description.

My invention relates to a composition for preserving eggs.

The object of the invention is to provide a simple and inexpensive composition for efficiently preserving eggs.

The invention may be stated as comprehending primarily the application of an odorless, colorless and tasteless liquid, to the shell of a freshly laid egg, which preserves said egg in its natural condition, substantially with a maintained natural color, taste and bulk, and which does not leave an oily or pasty deposit on the shell, which has hitherto been found very objectionable.

The composition is in the form of a liquid, the body of which is an oil, to which wax, gum and carbohydrates, such as sugar, glucose, flour, corn starch and the like, are added.

To a fifty gallon drum of pure medicinal mineral oil of a gravity of around .885, is added five pounds of highest grade gum damar crushed to pieces about one sixteenth to one eighth of an inch in diameter. This is placed in the oil cold. The drum is then rotated at intervals for forty-eight hours in order that the oil may absorb what it will. This imparts the first stickiness to the oil.

At the end of forty-eight hours, about three gallons of this mixture is drawn off and six pounds of refined Burgundy pitch is added to it. This is placed in a double boiler containing water in the outside so that no flame may heat the pitch and thereby crystallize it. It is steamed in this manner until the pitch is entirely dissolved, then put back in the drum with the balance of the oil. This is allowed to rest for forty-eight hours and the drum is rotated at different times in order to aid the mixing.

A small portion of this is then taken from the drum and into this is placed two ounces of cerasin wax and two ounces of Japan wax. These are then heated until thoroughly dissolved and this is added to the drum of solution.

I now have a perfect sealing compound when applied to the egg under intense heat.

I have discovered that by the addition of certain carbo-hydrates, I am able to consummate a much quicker drying solution and one which does not leave the shell of the egg in a greasy, unsightly condition as heretofore.

To a little of this oil which is heated, I add such material as corn starch, flour, glucose, sugar or any other material containing this character of carbo-hydrates. The one which I have found to be most efficacious being refined sugar. Two ounces of confectioner's sugar seems to impart just the right amount of drying properties to a fifty gallon drum of this solution.

When the egg is immersed in the mixture the latter is heated to any temperature sufficient to make it freely flow and volatile. That temperature may be from 150 degrees Fahrenheit to 300 degrees Fahrenheit and the heat aids in sterilizing the shell of the egg and upon being brought to the air, the gums and waxes congeal in the pores and the carbo-hydrate dries the oil which may remain, producing an egg that does not show any effects of having been treated.

Having thus described my invention, what I desire to secure by Letters Patent, is:—

1. A composition for preserving eggs consisting of a solution of a carbohydrate, mineral oil, odorless gum and wax, and refined Burgundy pitch.

2. A composition for preserving eggs, consisting of a carbo-hydrate, a colorless oil, the specific gravity of which is substantially .88, Japanese wax and an odorless gum substantially in the proportions described.

This specification signed and witnessed this 2nd day of May, 1923.

CLIFFORD C. SHAFER.